United States Patent [19]
Baur

[11] 3,722,942
[45] Mar. 27, 1973

[54] LOAD BEARING STRAP

[76] Inventor: Hans Baur, von der Osten Strasse 6, D-8902 Goggingen, Germany

[22] Filed: Mar. 13, 1972

[21] Appl. No.: 233,984

[30] Foreign Application Priority Data

Mar. 24, 1971 Germany..................P 21 14 207.4

[52] U.S. Cl..................................................294/74
[51] Int. Cl...................................................B66c 1/18
[58] Field of Search.........................294/74; 24/122.3

[56] References Cited

UNITED STATES PATENTS

| | | | |
|---|---|---|---|
| 1,168,802 | 1/1916 | Harrison | 294/74 |
| 2,598,921 | 6/1952 | Knudsen | 294/74 |
| 2,960,365 | 11/1960 | Meisen | 294/74 |

FOREIGN PATENTS OR APPLICATIONS 1,037,095  8/1958  Germany..................294/74

Primary Examiner—Evon C. Blunk
Assistant Examiner—Johnny D. Cherry
Attorney—Allison C. Collard

[57] ABSTRACT

A load bearing strap comprising a multiple strand cable having a pair of eye loops formed at its ends coupled to a shackle. An open loop is disposed at the other end of the strap and is formed by bending the cable and coupling its ends to the shackle. A resilient spacing member, having semi-cylindrical recesses in its sides, is disposed between the sections of the cable between the open loop and the pair of eye loops for supporting the sections of the cable. A multiple strand rope or cable is wound tightly around the cable and the spacing member to form a protective jacket on the cable and increase its rigidity.

10 Claims, 3 Drawing Figures

Patented March 27, 1973 3,722,942

LOAD BEARING STRAP

The present invention relates to load bearing straps, and in particular to a load bearing strap having at least two juxtaposed load bearing cable sections, and a wrapper or envelope of crosswise-disposed strings of fiber, plastic material, wire, cable or the like, to provide external protection.

Load bearing straps are advantageous since they provide a larger abutment surface than is ordinarily obtained with load bearing cable sections. Of the many methods utilized for providing external protection for load bearing cables, such as embedding the cable in a rubber composition, disposing rubber sleeves over the cables, or disposing complete rubber gaiters over the cables, a load bearing strap having crosswise-disposed strings as external protection stands out because of its high degree of pliability, softness and snugness of fit, which is particularly desirable and required for some loads.

In conventional load bearing straps, the cable sections which bear the load are spliced or interwoven with the crosswise-disposed strings forming the external protection envelope. The splicing of the cable sections, however, causes the load bearing strap to be relatively expensive to produce, and the spaced-apart relationship of the juxtaposed cable sections depends upon the type of strings utilized.

It is, therefore, an object of the present invention to provide a load bearing strap which retains the properties of pliability, softness and snugness of fit, characteristic of conventional load bearing straps having crosswise-disposed strings for protection, and yet which may be manufactured at a cheaper cost, and which may be designed as desired with respect to the spacing between the load bearing cable sections.

Accordingly, the present invention provides a load bearing strap which includes at least two spaced-apart rope or cable sections juxtaposed in the direction of the width of the strap. At least one spacing means, constructed of strips of elastic material, are interposed between the cable sections, The spacing means have a thickness substantially equal to the diameter of the cable sections, and have chamfered side portions for slidably receiving portions of the load bearing cable sections. A wrapper surrounds the cable sections and spacing means, and forms a jacket around the load bearing strip.

The present invention improves upon the known method of covering load bearing cables with fabric, and instead utilizes an inexpensive, simple external envelopment or wrapper which may be disposed on the load bearing cables easily and simply with a suitable machine. The elastic, plastic strips of material provide the required spacing between the load bearing cable sections, and are enveloped by the wrapping fabric. The plastic strips of material are inexpensive, and easy to install. The outer edges of the strands which make up the load bearing cable are forced into the spacing means between the chamfered sides of the spacing means when the wrapper is tightened. The spacing means are thus braced to the load bearing cable sections, and at the same time envelop the cable sections and form a single unit which is not affected by bending stresses produced when the load bearing strap is used. Furthermore, since the plastic strips are disposed on the load bearing strap in a position which is not usually subjected to load bearing stresses and twisting, the strips do not impair the pliability or flexibility of the load bearing strap.

The width of the plastic strips used may vary within wide limits, so that the juxtaposed spacing of the cable sections is not dependent, as in conventional load bearing straps, upon the diameter of the crosswise-disposed strings. In the present invention, the spacing may be considerably wider than in conventional straps. This wider spacing allows the strap itself to be constructed of a greater width with only two load bearing cable sections, something not possible with conventional load bearing straps using only two cable sections. In the conventional straps, to achieve the wide spacing that the present invention provides, three or more load bearing cable sections are required. A load bearing strap having two load bearing cable sections has the advantage that it provides uniform load distribution to each of the load bearing sections, especially when they are formed from a single cable houser having a loop formed at one end and which is connected to a shackle by the cable ends. Furthermore, the load bearing strap of the present invention when compared with spliced, crosswise-disposed strings, has a smoother outer surface.

Wire ropes or cables are normally utilized to form the load bearing strap. Cable constructed of plastic materials of sufficient strength, such as, for example, polypropylene, may also be used. Soft or hard fibers may be used for the crosswise-disposed strings, depending upon the nature of the loads carried by the strap. The strings may be interspliced, or of a single square profile, in order to form a jacket layer which is disposed as close as possible to the wrapper of the load bearing strap. The protective jacket formed by the strings may also be impregnated or vulcanized with cotton fabric or cord, according to known methods. If the load bearing strap is used in founderies and forges, wire cables may be required to be used as the protective strings. The plastic strips may be constructed of plastic materials such as polyvinylchloride, polyurethane, and other similar materials.

It is another object of the present invention to provide a load bearing strap which is simple in design, easy to manufacture, and which is reliable in its operation.

Other objects and features of the present invention will become apparent from the following detailed description taken in connection with the accompanying drawings which disclose one embodiment of the invention. It is to be understood, however, that the drawings are designed for the purposes of illustration only, and are not intended as a definition of the limits and scope of the invention.

In the drawings, wherein similar reference numerals denote similar elements throughout the several views.

Figure 1:
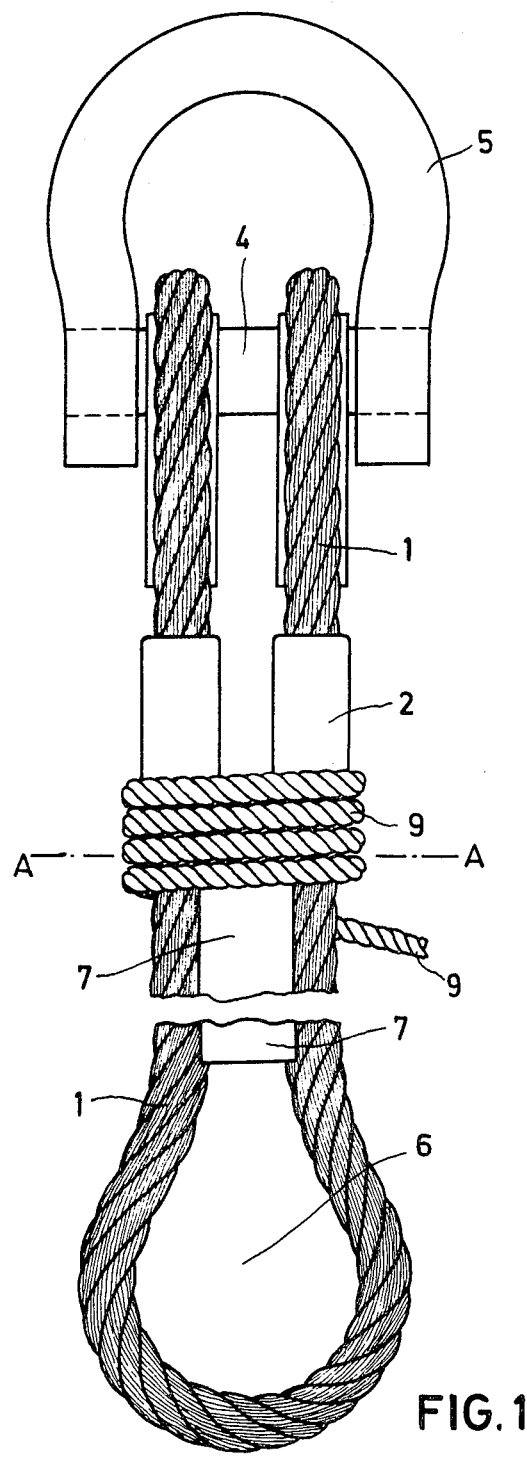
FIG. 1 is a side elevational view of a load bearing strap constructed in accordance with the present invention.
Figure 3:
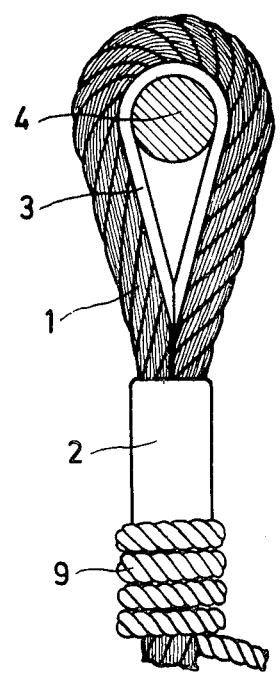
FIG. 3 is a partial front view of the load bearing strap showing a loop formed of the strap.
Figure 2:
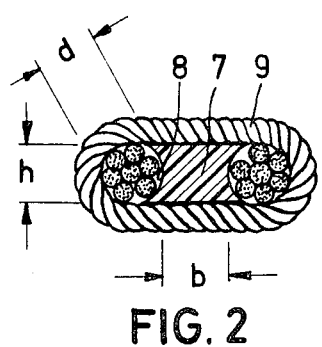
FIG. 2 is a cross-sectional view of the load bearing strap taken long section A—A of FIG. 1.

Referring to the drawings, there is shown a multiple strand wire rope or cable 1 having a pair of loops formed at its ends. An eye thimble 3 is disposed within the loop abutting cable 1, and may be a metallic strip. A pair of metallic retaining clips 2 are disposed over cable 1 and retain the ends of the cable to form the loops. The two loops, juxtaposed on a cylindrical pin 4 coupled to a shackle 5, form one end of the load bearing lifting strap. An open loop 6 formed by cable 1 forms the other end of the load bearing strap. Spacing means, shown as an elastic, plastic strip of material 7 having a thickness $h$ approximately equal to the diameter $d$ of cable 1, extends along the lengths of the longitudinally extending cable sections of cable 1 from loop 6 towards shackle 5. Therebetween, strip 7 has fluted or chamfered sides 8 having a substantially semi-cylindrical shape for receiving and retaining cable 1. Strip 7 extends from approximately the bottom of loop 6 formed by the cable to the ends of clips 2. The plastic strip is secured between cable 1, and cable 1 is secured tightly in the semi-cylindrical recesses of strip 7, by a tightly wrapped, crosswise-disposed multiple strand string 9 which is wound tightly around the cable sections and the strip to form a closed protective jacket around the load bearing strap. To start the winding around the cable sections, the end of string 9 may be secured by clips 2 on cable 1, and the string wound tightly around the cable sections and strip 7, as illustrated in FIG. 1. The width $b$ of strip 7 determines the spacing between the cable sections of the strap, and hence also the load bearing strap width. Although strip 7 is preferably constructed of suitable plastic material, the spacing means may also be constructed of a natural elastic substance, such as, for example, natural rubber. Choice of materials for construction of the load bearing strap depend upon the nature of its intended use. For example, if the strap is to be subjected to extremely heavy loads and operating conditions, wire cables are preferably used for cable 1 and the protective string 9. If, however, the loads to which the strap will be subjected are not excessive, rope or plastic material may be used.

While only a single embodiment of the present invention has been shown and described, it will be obvious to persons skilled in the art that many changes and modifications may be made thereunto without departing from the spirit and scope of the invention.

What is claimed is:

1. A load bearing strap, including a shackle for lifting or bearing a load, comprising:
a multiple strand cable of predetermined length, having a pair of eye loops formed at its ends coupled to the shackle and spaced apart thereon in juxtaposition, said cable including an open loop formed at the center of said cable by bending said cable and coupling said eye loops to the shackle, and a pair of parallel load supporting cable sections formed between said open loop and said eye loops for supporting the load;
spacing means, disposed between said parallel load supporting cable sections, for separating and rigidly supporting said cable sections; and
means, wrapped around said load supporting cable sections and said spacing means, and crosswise-disposed on the strap perpendicular to said load supporting cable sections, for forming protective jacket around said cable sections and said spacing means and securing said spacing means therebetween.

2. The load bearing strap as recited in claim 1, wherein said means wrapped around said spacing means and said cable sections is a multiple strand cable.

3. The load bearing strap as recited in claim 2, wherein said spacing means comprises a resilient rectangularshaped member, having a thickness approximately equal to the diameter of said cable.

4. The load bearing strap as recited in claim 3, wherein said spacing means further comprises semi-cylindrically shaped recesses, disposed in the sides of said spacing means and extending the length thereof, for receiving said load supporting cable sections and securing said spacing means therebetween.

5. The load bearing strap as recited in claim 4, wherein said spacing means is constructed of plastic material.

6. The load bearing strap as recited in claim 4, wherein said spacing means is constructed of polyvinylchloride.

7. The load bearing strap as recited in claim 4, wherein said spacing means is constructed of polyurethane.

8. The load bearing strap as recited in claim 4, wherein said spacing means is constructed of natural rubber.

9. The load bearing strap as recited in claim 4, wherein said pair of eye loops are forged at the ends of said elongated cable by a plurality of cylindrical clips disposed over said cable for securing the ends thereof, and an elongated, rectangular-shaped planar strip, disposed on the inside surface of said loop, for engaging the shackle and thereby coupling said load supporting cable sections to the shackle, and wherein said crosswise-disposed multiple strand cable wrapped around said cable sections and said spacing means is secured at one end on said cable by said clips.

10. The load bearing strap as recited in claim 9, wherein said spacing means extends from said clips disposed on said cable to said open loop formed at the center of said cable.

* * * * *